United States Patent
Fei et al.

(10) Patent No.: US 9,584,836 B2
(45) Date of Patent: Feb. 28, 2017

(54) MOBILITY ENHANCED ADVERTISING ON INTERNET PROTOCOL TELEVISION

(71) Applicant: International Business Machines Corporation, Armonk, NY (US)

(72) Inventors: Hongliang Fei, Millwood, NY (US); Kin H. Lei, Union City, CA (US); Ming Li, New York, NY (US); Sambit Sahu, Hopewell Junction, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/476,268

(22) Filed: Sep. 3, 2014

(65) Prior Publication Data
US 2016/0066041 A1  Mar. 3, 2016

(51) Int. Cl.
| | | |
|---|---|---|
| H04N 7/025 | (2006.01) | |
| H04N 21/231 | (2011.01) | |
| H04N 21/25 | (2011.01) | |
| H04N 21/258 | (2011.01) | |
| H04N 21/2668 | (2011.01) | |
| H04N 21/81 | (2011.01) | |
| H04N 21/442 | (2011.01) | |
| H04N 21/234 | (2011.01) | |
| H04N 21/643 | (2011.01) | |

(52) U.S. Cl.
CPC . *H04N 21/23109* (2013.01); *H04N 21/23424* (2013.01); *H04N 21/252* (2013.01); *H04N 21/25841* (2013.01); *H04N 21/25891* (2013.01); *H04N 21/2668* (2013.01); *H04N 21/44222* (2013.01); *H04N 21/64322* (2013.01); *H04N 21/812* (2013.01)

(58) Field of Classification Search
None
See application file for complete search history.

(56) References Cited

U.S. PATENT DOCUMENTS

| | | |
|---|---|---|
| 7,974,976 B2 | 7/2011 | Yahia et al. |
| 8,166,016 B2 | 4/2012 | Higgins et al. |
| | (Continued) | |

FOREIGN PATENT DOCUMENTS

| | | |
|---|---|---|
| WO | WO2008117191 | 10/2008 |
| WO | WO2010121724 | 10/2010 |

OTHER PUBLICATIONS

Anonymous, "Method and Apparatus for Integrating Online Social Media in TV as a Service", An IP.com Prior Art Database Technical Disclosure; http://ip.com/IPCOM/000197674D, Jul. 19, 2010, 3 pages.

Dacosta, B.; "Personalized News"; An IP.com Prior Art Database Technical Disclosure; http://ip.com/IPCOM/000132562D; Jan. 3, 2006, 2 pages.

Siemens, AG, et al.; "Method for Usage Statistic in Assisting User in Selection of Content"; An IP.com Prior Art Database Technical Disclosure; http://ip.com/IPCOM/000138718D, Jul. 31, 2006, 1 page.

(Continued)

*Primary Examiner* — Fernando Alcon
(74) *Attorney, Agent, or Firm* — Scully, Scott, Murphy & Presser, P.C.; Kelvan Razavi

(57) ABSTRACT

Enhanced personalized advertisements may be provided through media such as IPTV, for example, by analyzing data such as subscribers' mobility data (calling and movement data), television (TV) watching history, online browsing data (e.g., Internet, web site browsing), and subscribers' historical purchasing transactions. With the analysis, subscribers' contexts, any information that reflects subscribers' interests and activities, and intents, tendency to buy certain products, items, services, and/or travel to some locations may be inferred.

20 Claims, 12 Drawing Sheets

(56) References Cited

U.S. PATENT DOCUMENTS

| | | | |
|---|---|---|---|
| 8,250,600 B2 | 8/2012 | Kodialam et al. | |
| 8,327,399 B2 | 12/2012 | Noll et al. | |
| 8,479,229 B2 | 7/2013 | Cansler et al. | |
| 2002/0129368 A1* | 9/2002 | Schlack | G06Q 30/02 725/46 |
| 2002/0169540 A1* | 11/2002 | Engstrom | G06Q 30/02 455/414.3 |
| 2007/0143787 A1 | 6/2007 | Cankaya | |
| 2007/0260604 A1* | 11/2007 | Haeuser | H04L 63/10 |
| 2007/0283384 A1* | 12/2007 | Haeuser | H04N 7/165 725/34 |
| 2008/0090513 A1* | 4/2008 | Collins | G06Q 30/0251 455/3.01 |
| 2008/0181225 A1 | 7/2008 | Zampiello | |
| 2009/0150373 A1* | 6/2009 | Davis | G11B 27/105 |
| 2009/0210898 A1* | 8/2009 | Childress | H04H 60/46 725/34 |
| 2009/0217319 A1 | 8/2009 | Weiss | |
| 2010/0057560 A1* | 3/2010 | Skudlark | G06Q 30/02 705/14.49 |
| 2010/0205628 A1* | 8/2010 | Davis | H04N 21/478 725/25 |
| 2012/0011530 A1 | 1/2012 | Bentolila et al. | |
| 2012/0222063 A1* | 8/2012 | Mao | H04N 7/17318 725/31 |
| 2012/0240158 A1 | 9/2012 | Pan | |
| 2013/0036434 A1* | 2/2013 | Shkedi | H04N 21/4524 725/14 |
| 2013/0145023 A1* | 6/2013 | Li | H04N 21/44222 709/224 |
| 2013/0174196 A1* | 7/2013 | Herlein | G06Q 30/02 725/35 |

OTHER PUBLICATIONS

Kim, M., et al.; "Target Advertisement service using TV viewers' profile inference", Advances in Multimedia Information Processing—PCM 2005, 6th Pacific-Rim Conference on Multimedia, Lecture Notes in Computer Science, Nov. 2005, pp. 202-211, vol. 3767, Springer-Verlag Berlin Heidelberg, Germany.

Lopez-Nores, M. et al.; "Spontaneous interaction with audiovisual contents for personalized e-commerce over digital TV", Expert Systems with Applications, Apr. 2009, pp. 4192-4197, vol. 36, Issue 3.

Yavas, G., et al., "A data mining approach for location prediction in mobile environments", Data & Knowledge Engineering 54, Available online Oct. 30, 2004, pp. 121-146.

Vu, T. H. N., et al., "A method for predicting future location of mobile user for location-based services system", Computers & Industrial Engineering 57, Available online Jul. 22, 2008, pp. 91-105.

Lee, J., et al., "PREA: Personalized Recommendation Algorithms Toolkit", Journal of Machine Learning Research Sep. 13, 2012, pp. 2699-2703.

Burbey, I. E., "Predicting Future Locations and Arrival Times of Individuals", Dissertation submitted to the faculty of the Virginia Polytechnic Institute and State University in partial fulfillment of the requirements for the degree of Doctor of Philosophy in Computer Engineering, Apr. 26, 2011, 225 pages, Blacksburg, Virginia.

Ageev, M. et al., "Improving Search Result Summaries by Using Searcher Behavior Data", SIGIR'13, Jul. 28-Aug. 1, 2013, 10 pages, Dublin, Ireland.

\* cited by examiner

MOBILITY ENHANCED ADVERTISING ON INTERNET PROTOCOL TELEVISION

FIELD

The present application relates generally to computers, and computer applications, and more particularly to mobility enhanced advertising on media such as internet protocol television.

BACKGROUND

Even in digitized media such as the Internet Protocol IPTV, the current advertisements are delivered in a passive way, namely, that all subscribers are shown the same advertisements given the same period and channel without considering individual characteristics, habits or interests. While there are several methods that aim to deliver flexible advertisements, they depend only on segmenting subscribers by their demographics or provide a hardware system for targeting a group of users without specifying who to target.

BRIEF SUMMARY

A method of selecting advertisements to play on internet protocol television, in one aspect, may comprise determining individual context and intent for a plurality of members of a household having internet protocol television subscription. The method may also comprise determining a program played on the internet protocol television. The method may further comprise predicting which individual in the household is watching the program based on current mobility data associated with the members of the household and user profiles associated with the members of the household, the predicting performed using a disambiguation predictive model built based on mobility data, calling data associated with the members of the household and television watching log associated with the household, the current mobility data determined based at least on information received from one or more mobile devices associated with the members of the household. The method may further comprise selecting an advertisement for delivery via the internet protocol television from a database of advertisements that matches an interest of the individual determined to be watching the program based on the individual context and intent associated with the individual.

A system for selecting advertisements to play on internet protocol television, in one aspect, may comprise a hardware processor and a storage device storing user profiles. The user profiles may comprise an individual user's browsing profile disambiguated based on the user's mobility data, the user's calling data and the television watching log. The user profiles may further comprise user's mobility profile, user's calling profile, and user's transaction profile generated based on user's historical transaction data. The hardware processor may be further operable to determine individual context and intent for a plurality of members of a household having internet protocol television subscription. The hardware processor may be further operable to determine a program played on the internet protocol television. The hardware processor may be further operable to predict which individual in the household is watching the program based on current mobility data associated with the members of the household and the user profiles associated with the members of the household, the hardware processor using a disambiguation predictive model built based on mobility data, calling data associated with the members of the household and television watching log associated with the household. The hardware processor may be further operable to select an advertisement for delivery via the internet protocol television from a database of advertisements that matches an interest of the individual determined to be watching the program based on the individual context and intent associated with the individual.

A computer readable storage medium storing a program of instructions executable by a machine to perform one or more methods described herein also may be provided.

Further features as well as the structure and operation of various embodiments are described in detail below with reference to the accompanying drawings. In the drawings, like reference numbers indicate identical or functionally similar elements.

DETAILED DESCRIPTION

Figure 1:
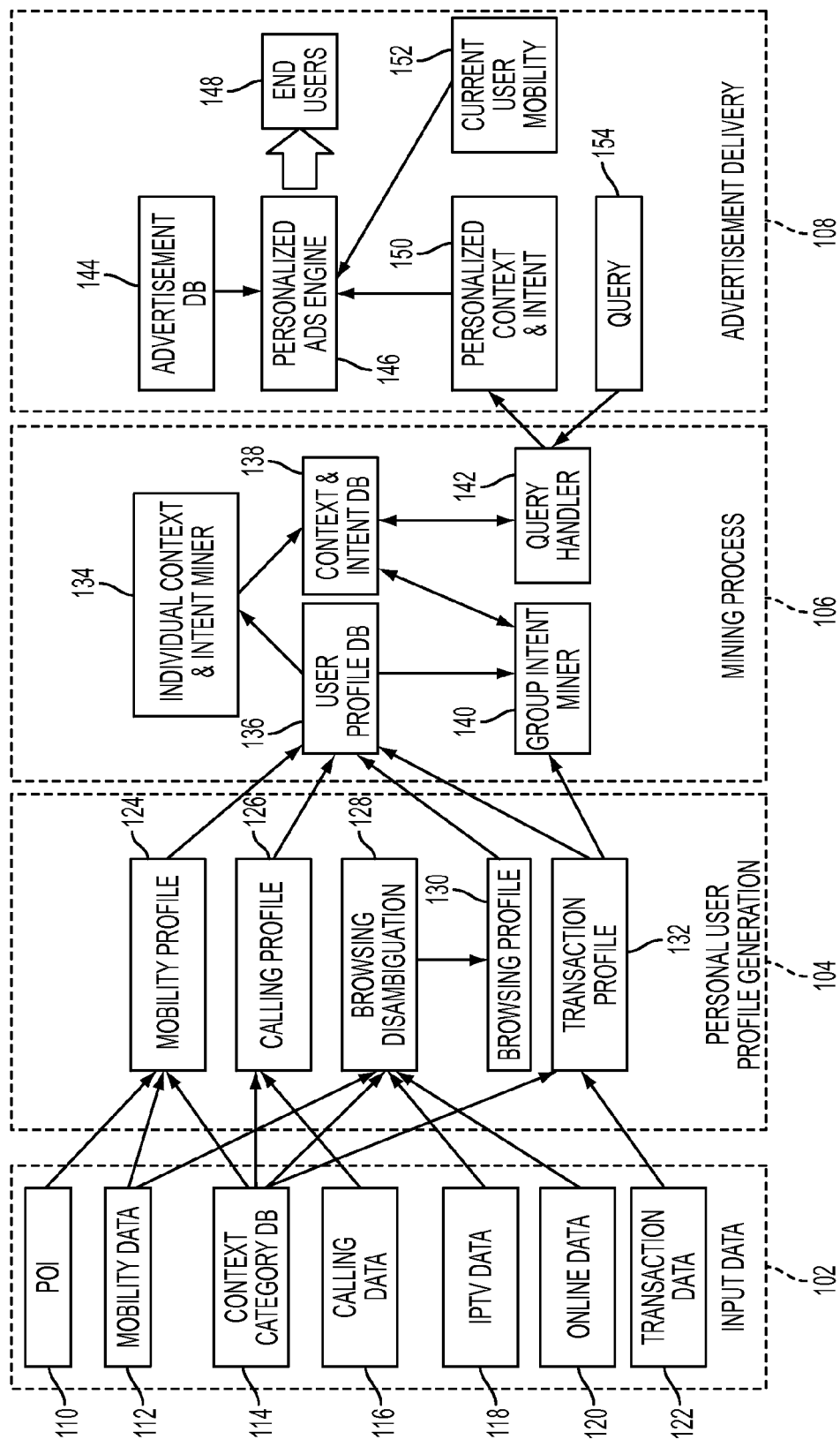
FIG. 1 is a diagram illustrating system architecture and a method workflow in one embodiment of the present disclosure.

In the present disclosure in one embodiment, a methodology to deliver enhanced personalized advertisements through media such as IPTV is presented, for example, by analyzing data such as subscribers' mobility data (calling and movement data), television (TV) watching history, online browsing data, and subscribers' historical purchasing transactions. With the analysis, subscribers' contexts, any information that reflects subscribers' interests and activities, and intents, tendency to buy certain products, items, services, and/or travel to some locations are inferred. The methodology of the present disclosure in one embodiment may allow telecommunication and IPTV operators to understand subscribers' contexts and intents, for example, leading to the results of enhanced control of what and when advertisements to deliver as well as to whom to deliver. Recognizing customers' intent and delivering right advertisements to right subscribers at right time may help in maximizing the results of advertising and minimizing the cost in advertising. The methodology of the present disclosure in one embodiment may also be able to identify a specific person within a group of persons, e.g., within a family, for delivering targeted advertisements.

The methodology of the present disclosure may utilize and leverage subscribers' mobility data, historical transaction data, TV watching data and online history data to infer IPTV subscribers' context and intent/interest. In one embodiment, the methodology may focus on people's purchasing context and intent, to deliver the right advertisement through, e.g., IPTV or like media to the right subscribers at the right time. The methodology may be used by telecommunication, IPTV, and Internet enterprises or companies, e.g., for delivering advertisements to their customers.

In one embodiment, the methodology of the present disclosure may include: 1) data summarization that filters input data to reduce noise and sparseness in the data (e.g., there is no direct relation between one subscriber in mobility data source to online/TV browsing data source) and user profile generation; 2) mining process, a process of discovering subscribers' contexts and intents from their summarized data; and 3) advertisement delivery, to deliver right advertisements through IPTV or like media to the right subscribers at the right time.

Businesses such as telecommunications, IPTV, and Internet companies have a large amount of data about their subscribers, including call detail record (which shows where a call is made, when the call is made, from whom (e.g., telephone number and location from which the call is made, to whom, and how long) and even online browsing history. Retailers that put advertisements on IPTV may also share a certain amount of transaction data where the mobile phone number is linked with user's consent on privacy. The methodology in one embodiment of the present disclosure may utilize all these data sources to infer subscribers' contexts and intents to provide an enhanced IPTV advertising.

In one embodiment of the methodology of the present disclosure, a user or subscriber profile may be generated from mobility and calling data in combination with other data sources, including for example point of interest (POI) data, TV watching, internet browsing data and transaction data, to enhance targeted IPTV advertising. The methodology of the present disclosure may add values of existing data to targeted IPTV advertising. For example, user profile may be enriched with mobility data and calling data. The methodology may disambiguate TV watching, internet browsing history to build individualized user profile for delivering right advertisements to the right person, and provide side information during advertisements delivery stage, e.g., who is at home and is more likely to watch TV. The methodology may also identify the contexts and intents that best describe subscriber's situation and tendency from the enriched user profiles for targeting.

The present disclosure thus may provide for the following: Disambiguating TV/internet browsing history for generating user personalized profile; Generating subscriber's context from enriched personalized user profile built from data such as mobility, calling, TV, internet and transaction data; A dictionary of general features and context specific features that represent subscriber's intent (tendency) to buy a certain product/service; A supervised model to predict subscriber's intent, e.g., in near future, from the feature dictionary and transaction history; A scheduling algorithm to send targeted advertisements to subscribers based on their contexts, intents and current mobility.

FIG. 1 is a diagram illustrating system architecture and a method workflow in one embodiment of the present disclosure. In one embodiment, personal user profile generation process may generate personal profiles based on input data 102, e.g., by preprocessing and summarizing the input data 102. Mobility profile 124 may be generated, e.g., based on mobility data 112, point of interest (POI) 110 and context category database 114. POI 110 may provide a map or location of places such as shops, restaurants, and others. Mobility profile 124 may include visited locations and their corresponding categories. This information may be extracted or summarized using mobility data 112 that may include visited locations. The visited location information can be extracted from subscribers' call detail records (e.g., based on calls made on user's mobile devices (e.g., a mobile phone or the like), e.g., that have location aware devices such as global positioning system receiver/transmitter device) and the location category information can be found from point of interest map (POIs) 110 and context category database 114. Context category database 114, e.g., may contain information that matches or maps a location in POI to a category of places, e.g., particular store name and type (or category) of the place. The resulting summary generated as the mobility profile 124 may be a list of tuples, e.g., <time, location, category, duration>(e.g., <3:00 pm, Store X, Fashion, 30 min>).

Similarly, calling profile 126 may be generated as a summarized activity, e.g., as <time, phone #, category, duration>(e.g. <2:00 pm, venue business #, Fashion, 2 min>) using the calling data 116, context category database 114 and yellow pages. Calling data 116 may include call detail records, e.g., the number called, the location where the call was made, the duration of the call, and any other information contained in a phone service provider's call records.

For TV watching and internet browsing history, browsing disambiguation 128 is performed, e.g., because the history data for TV watching and internet browsing may not distinguish a particular member in a group, from the entire group. For example, while such historical data may show that a particular household watched a certain TV program or browsed certain sites, the data does not associate TV watching or internet browsing to a particular member of the household or family. For instance, such data do not identify which member of the family watched a particular program as the history may be from any family (or another group) member within the house.

To generate a personalized browsing profile 130, the methodology of the present disclosure in one embodiment disambiguates the watching history, e.g., by detecting home locations of multiple people and identifying the family (or group) relationship. The methodology in one embodiment of the present disclosure defines the home location as the location where the user spends the most of time at night over a certain period of time. Some people may live in the same neighborhood and mobility data 112 may not have the accuracy to household level. Therefore, the methodology in one embodiment of the present disclosure may further infer the family relationship from potential family members by considering their inter-calls (calling to each other) and co-location (e.g., being together at the same location). For instance, if another person is at the same location as the user for a specified amount of time or duration during specified hours of day (e.g., night time), and the calling records indicate that the user and that person have communicated via calls a threshold (e.g., predefined) number of times, the methodology of the present disclosure in one embodiment may infer that the user and that other person are in the same family or have a family relationship.

After home detection and family relationship identification, the methodology of the present disclosure may traverse TV watching data or record 118 and internet browsing record such as online data 120, family member's movement data 112, context category database 114, and other summarized data to determine who is not likely to watch TV or surfing the internet. The remaining people in the household while a certain program was played would be all considered as watching the program. The resulting summary may take the form of <time, category, program/item name/uniform resource locator (URL), duration>(e.g. <9:00 am, Fashion, Perfume, 30 min>). IPTV data 118 may include TV watching log, e.g., what programs were watched, the time and duration. Online data 120 may include URL browsing history.

Transaction data 122 may include a user's buying or purchase history data such as items purchased by a user, e.g., online and/or by mobile applications, and others. Briefly, mobile applications refer to computer code or applications that run or execute on a mobile device. Transaction profile 132 may include a user's purchase transactions determined from the transaction data 122 and using context category database 114, e.g., to determine the category of transaction. Example data in transaction profile 132 may include <time/date of purchase, category, item>.

In another aspect, in addition to directly observing summary information from input data, basic demographic information may be inferred from mobility, calling activity, TV watching, internet browsing and historical transaction data, e.g., using one or more rules. Such rules, e.g., may infer demographic information based on the type of TV program watched, content browsed, and/or location of users at different times of the day. As a specific example, a family with children may be watching a children's program, hence an example rule may specify to infer that a user is a part of a family with children. The demographic information may be stored into user profile. Example demographic information in a user profile may include <age range, gender, HasChildren, education>.

The user profiles generated, for example, shown at 104, from the input data 102 thus may include mobility profile 124, calling profile 125, browsing profile 130, and transaction profile 132.

Mining process 106 may determine user's intent based on the user profiles 136 generated in user profile generation 104. Context and Intent Miner 134 combines the user profiles 136 to generate contexts in a specified period. The importance of each context may be determined by a score. For example, a score may be computed based on the category frequency (how many times one particular category appear in one's summary), normalized category frequency, or other advanced scoring functions. Given context summarization and other summarized results about the user (e.g., subscriber), which could take the form of a request for information, a purchase transaction at a retailer or service provider, or simply a click-through to get additional information on a product, an intent predictive model to predict the tendency to buy certain products/items/services can be trained with a supervised collaborative approach. The determined contexts and intents of the users (e.g., all subscribers) may be saved in a context and intent database 138. In addition to an individual context and intent mining at 134, group intent may be mined at 140, e.g., for a group as a whole.

Two sample rows are shown in Table 1. Table 1 shows an example of personalized context and intent table in a particular day.

TABLE 1

| Name | Date | Top Context categories and their items |
|---|---|---|
| User 1 | Jun. 9, 2013 | Fashion: perfume, shoes; Auto: model ABC |
| User 2 | Aug. 9, 2013 | Electronics: phone type XYZ; Sports: tennis |

A query handler 142 may be also included to query the database 138 to find what contexts and items are popular in a certain time. A query may be made to the database 138 such as, "given a particular user and a time period, what are his or her contexts and intents?" Such information may be used in one embodiment of the present disclosure for advertisement selection and delivery 108.

Using the individual's mined context and intent information (e.g., at 106), advertisement selection and delivery process 108 is able to deliver personalized advertisement to an individual, e.g., even a particular individual within a household. For instance, an IPTV operator or another user may query the context and intent database 138, e.g., by posing a query 154 to a query handler 142 that searches the context and intent database 138 for context categories and items 150 for a particular subscriber (e.g., subscription household). Based on the user mobility data in real time (e.g., current user mobility) 152, IPTV operators or another user may discover who associated with this subscriber is at home currently. By querying the advertisement DB 144 using the determined context categories or items 150 associated with a member of the household associated with this subscriber determined to be home currently, a personalized advertisement engine 146 may determine what advertisement should be delivered now or in the near future to the end user 148 (e.g., the member determined to be home).

In addition to delivering advertisements at a household level, another way is to deliver advertisements is to a group of households with similar contexts and intents. Once advertisements are selected and delivered to subscribers, context and intent mining process may be incrementally updated periodically or on demand to the IPTV operators or another user so that advertisements from other categories may be added. For example, after a subscriber purchases a car from a dealer, he is likely to visit auto accessory store. The advertisements delivered to the subscriber may take this into consideration; e.g., the advertisements will be less likely about new cars but more likely for accessories for the new car, for example, for a period of time after the purchasing of the car.

Figure 2:
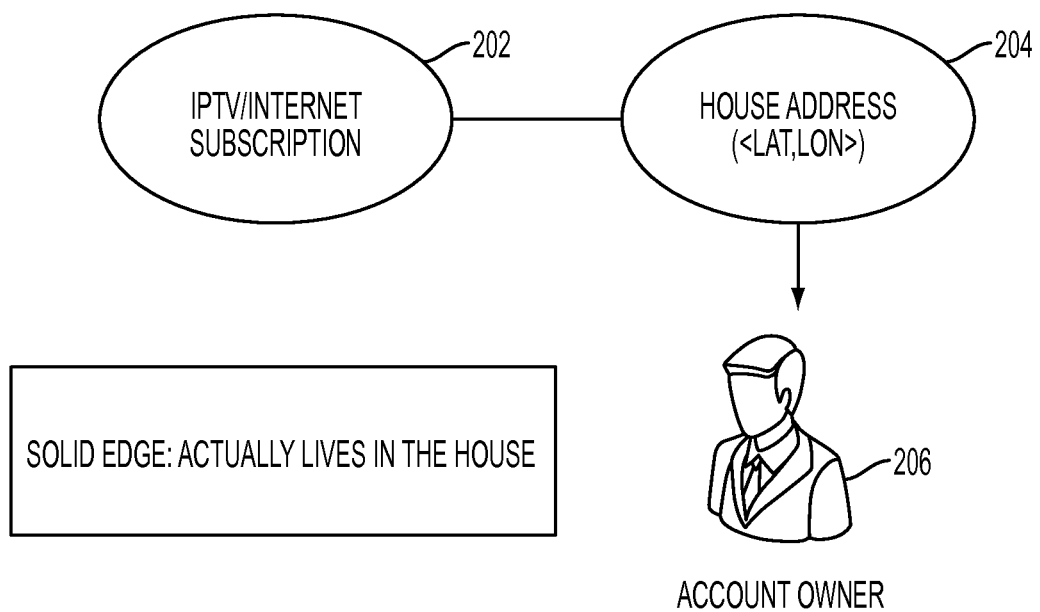
FIGS. 2-6 illustrate this disambiguation process in one embodiment of the present disclosure.

As described above, TV watching and/or online browsing may have been performed by any family member of a subscriber. Hence, in one embodiment of the present disclosure, a disambiguation procedure (e.g., shown at 128) generates personalized browsing profile (e.g., 130). FIGS. 2-FIG. 6 illustrate this disambiguation process in one embodiment of the present disclosure. Referring to FIG. 2, browsing (e.g., TV, Internet, online, others) profile generation may use an address, e.g., house address 204 associated with a subscription 202. Account owner 206 is determined to be the name associated with the subscription 202. Geographic location, e.g., by latitude (lat) and longitude (lon) coordinates, may be also determined based on the house address 204. Using this information, it is determined that the account owner 206 lives in the house at this location (e.g., address, <lat, lon>).

Figure 3:
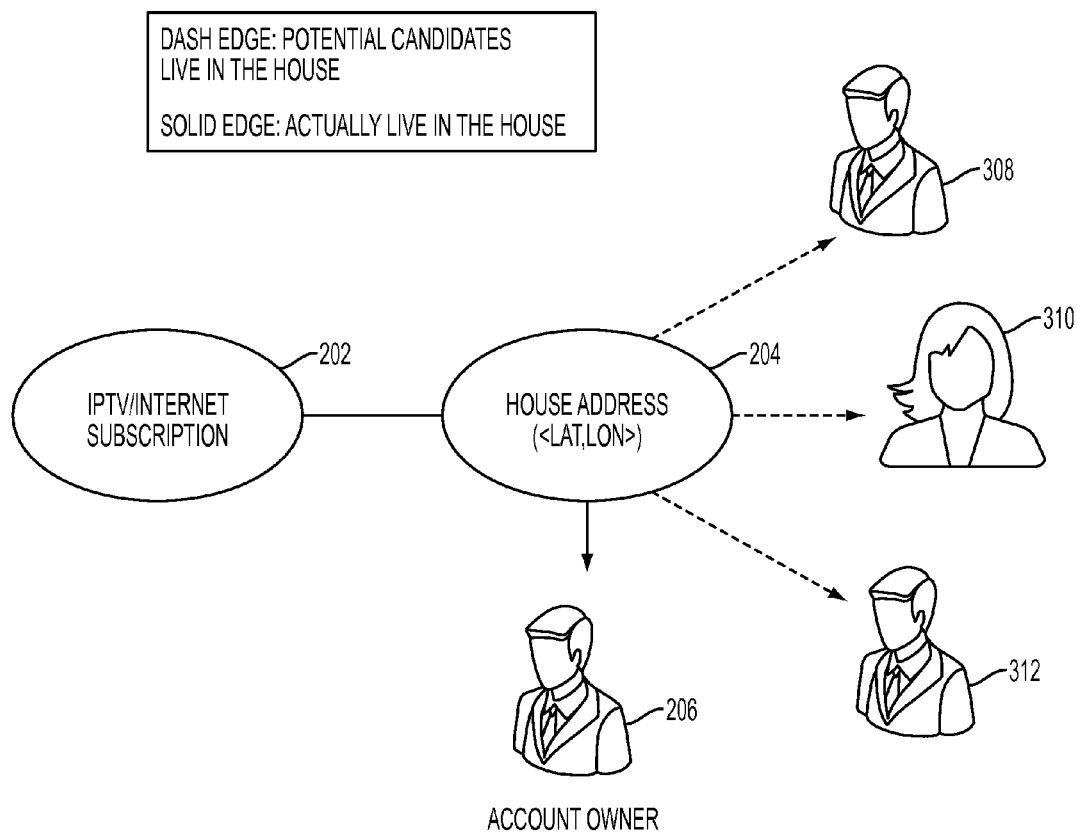

Referring to FIG. 3, home location of a plurality of mobile data users may be determined from the mobility data associated with those users. In one embodiment of the present disclosure, home location is determined to be where a user spends most of his/her night time. In FIG. 3, users at 308, 310 and 312 may be determined to be in the area of the house address, e.g., from their mobility data. Hence, those users are identified as potential candidate who live in the house having the house address 204, and may be considered to be members who watch TV or browse online under the same subscription 202 of the account owner 206, for example, family members of the account owner 206.

Figure 4:
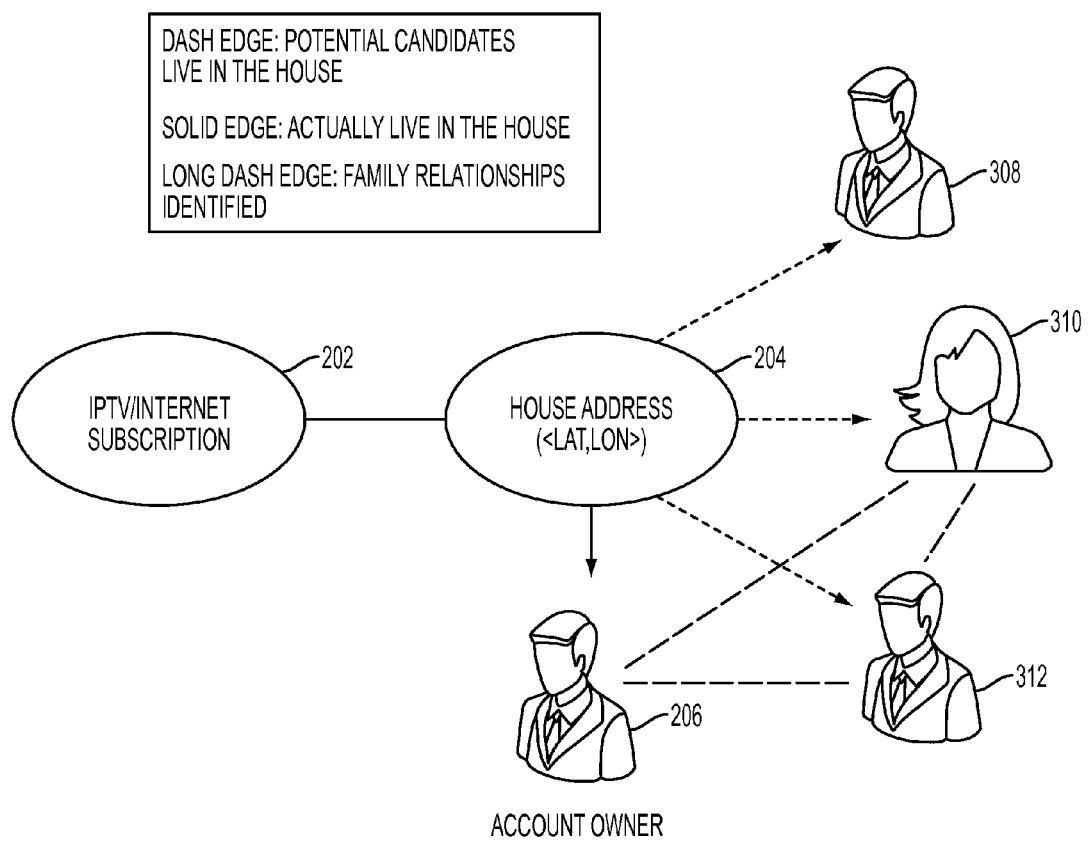
Figure 5:
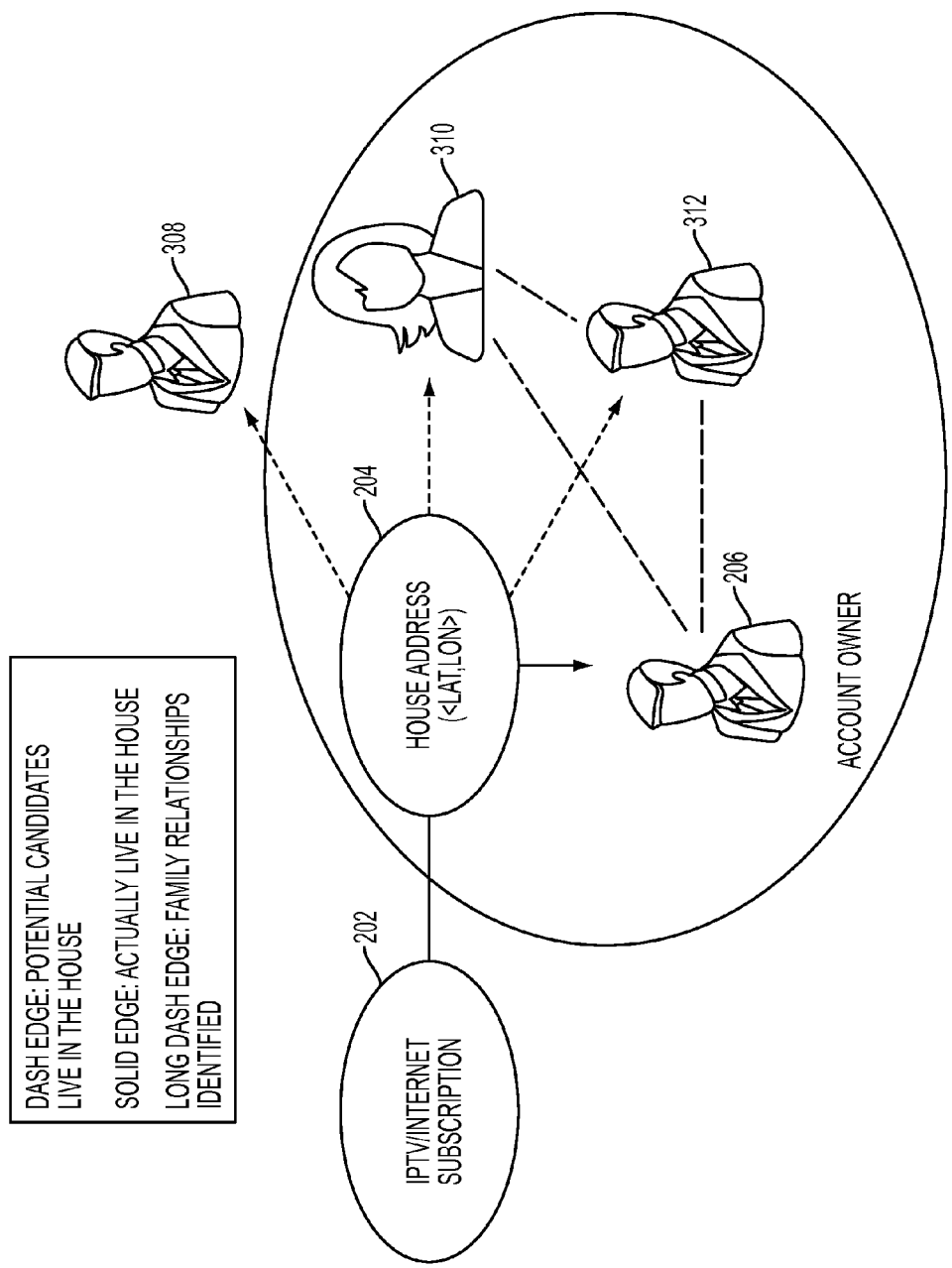

Referring to FIG. 4, family relationship between the account owner 206 and the users at 308, 310 and 312 may be detected from frequent calling and co-location pattern of those users and the account owner 206. For example, it may be assumed that "families" share the same home location and call and co-occur with each other more frequently. In one embodiment of the present disclosure, the number of calls are detected between the users 308, 310, 312 and the account owner 206, e.g., from call detail records associated with the phones of the users. The users having the number of calls that meet the predefined number or threshold of calls are determined to be in the same household. As an example, shown in FIG. 5, users 310 and 312 are identified as living in the same household as the account owner 206, e.g., they are determined to be family members.

Figure 6:
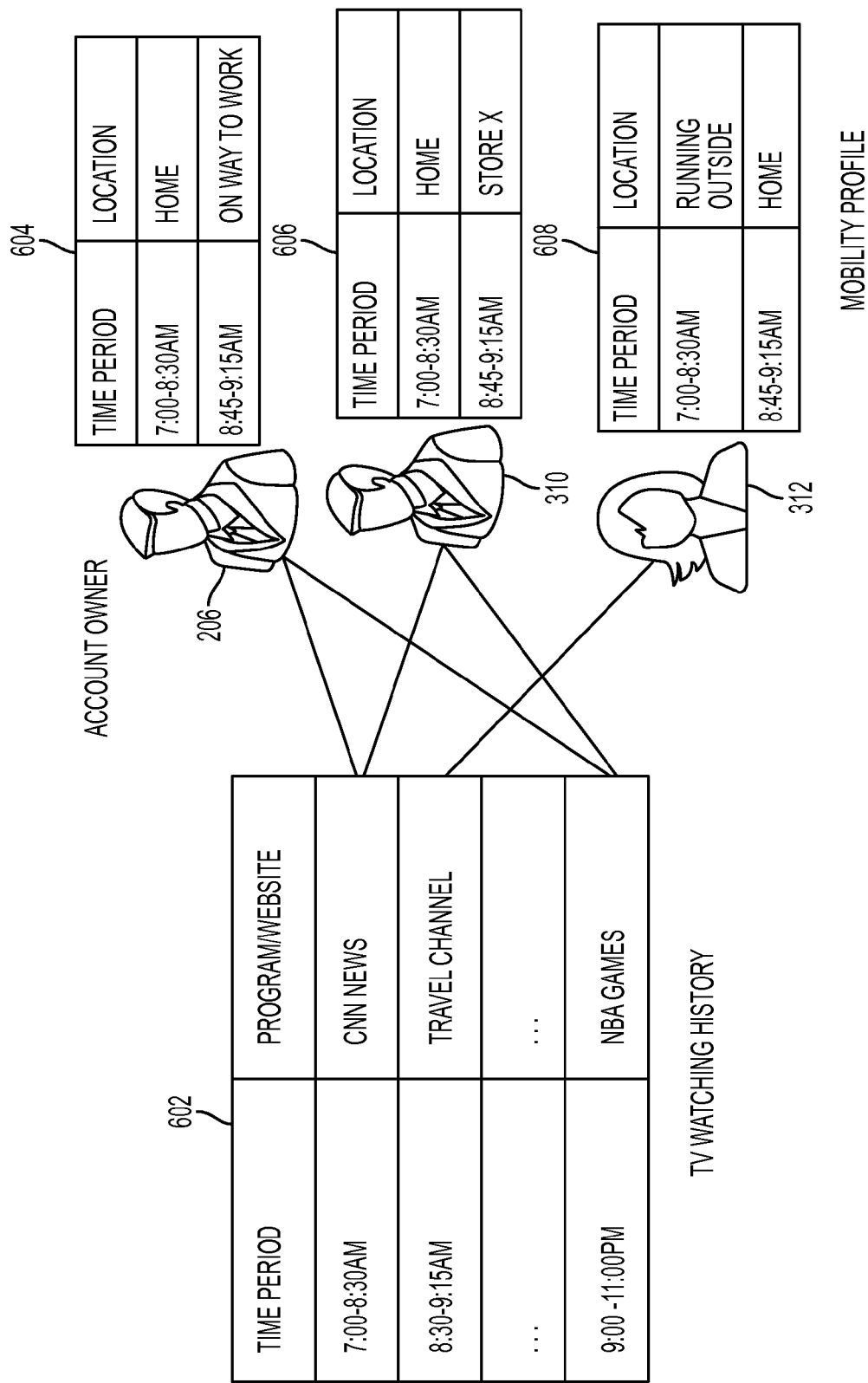

FIG. 6 shows TV watching/browsing history matching for individual users determined to be members of the same household as the account owner, using mobility profile (e.g. 124 in FIG. 1), of the users. In one embodiment of the present disclosure, by spatial and temporal filtering, if a user is not determined to be at home (by mobility profile of the users) then he/she is determined to not have watched the program. As an example, the mobility profile 604 for the account owner 206 indicates that during 7:00-8:30 am, the account owner 206 was at home and during 8:45-9:15 am, the account owner 206 was on the way to work, and therefore was not at home. TV watching/online browsing history data 602 may indicate programs watched or places browsed at different periods of time at the household. Based on who is not at home during those times and/or at home during those times, an individual who watched/browsed those programs/places may be inferred or determined. Thus, for example, it may be inferred that the account owner 206 watched a program that was on during 7:00-8:30 am, but not the program that was watched in the household during 8:45-9:15 am. Similarly, for the users at 310 and 312, it may be inferred that the users did not watch the program that was on while the users were not at home.

Figure 7:
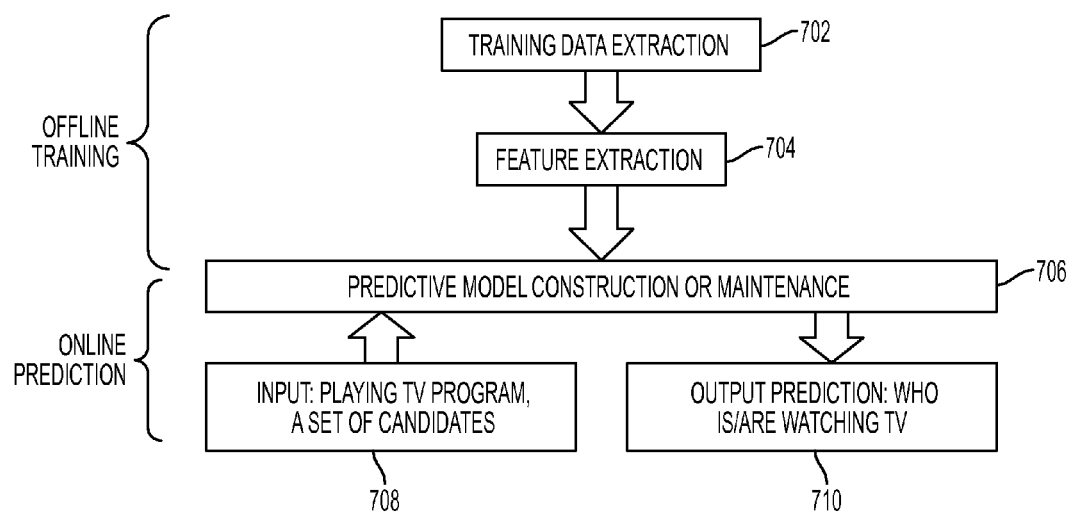
FIG. 7 is a diagram illustrating a disambiguation model workflow in one embodiment of the present disclosure.

FIG. 7 is a diagram illustrating a disambiguation model workflow in one embodiment of the present disclosure. Training data extraction 702 may extract positive samples and negative samples. Examples of positive samples may include users who watch TV or use Internet (e.g., browse online) at home by themselves, e.g., which programs the users are watching. Examples of negative samples may include TV programs that are not being played at home TV, and/or sample representative websites that are not being browsed at home. For example, from the data determined with reference to FIG. 6, by combining the TV watching log and mobility profile, information such as who watched TV or used Internet at home, who did not likely watch TV at certain time (e.g., based on their mobility profile), may be determined. Positive samples include the programs played while the user is at home, e.g., especially alone. Negative samples include those programs played while the user is not at home.

Feature extraction 704 in one embodiment includes extracting keywords from online browsed documents, e.g., "news", "fashion", "politics", and extracting TV program description, category and other information, e.g., from a TV program catalog. In addition to keywords features, temporal features may be also extracted, such as the time of day, day of week when the user watched TV. In one embodiment, the training data extraction and feature extraction may be performed offline line. Construction of the predictive model may also be performed offline.

Predictive model construction and/or maintenance builds a predictive model based on the training data obtained at 702 and the features obtained at 704. The predictive model, e.g., is trained using the extracted features in the training data set to be able to predict who is watching a given program that is being played. Supervised learning models such as support vector machine (SVM), a machine learning technique, and decision trees may be used to build a predictive model. The predictive model may be updated, for example, incrementally or regularly using additional data.

The constructed predictive model may be used to predict who is watching a TV program. For instance, given the TV program that is being played and a set of candidate users, the predictive model may output a prediction of who among the set of candidate users is/are watching the program. For example, based on the features of the TV program that is being played and features of the set of candidate users, the predictive model predicts who is likely to be watching the program.

Figure 8:
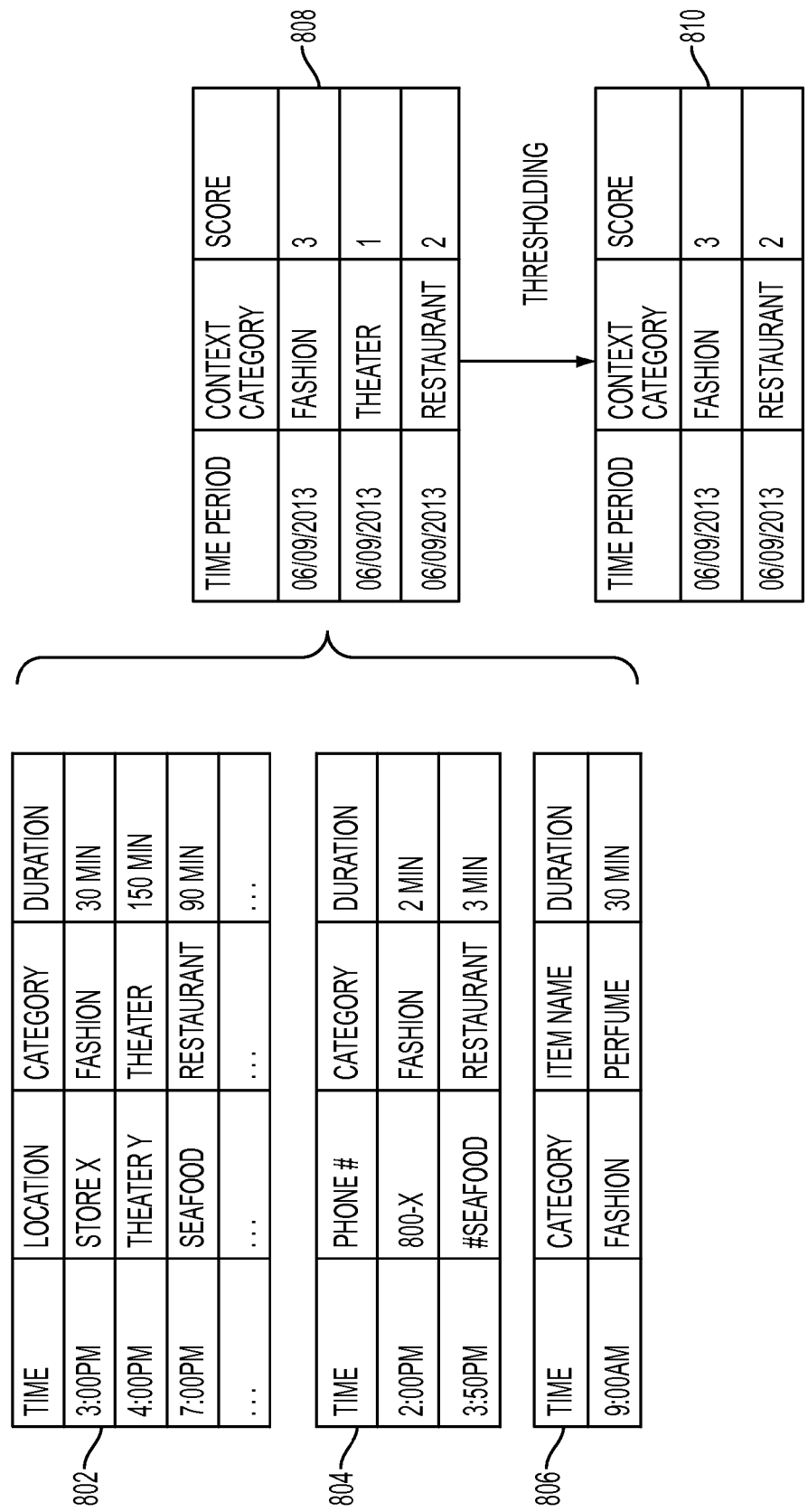
FIG. 8 shows a context mining in one embodiment of the present disclosure.
Figure 9:
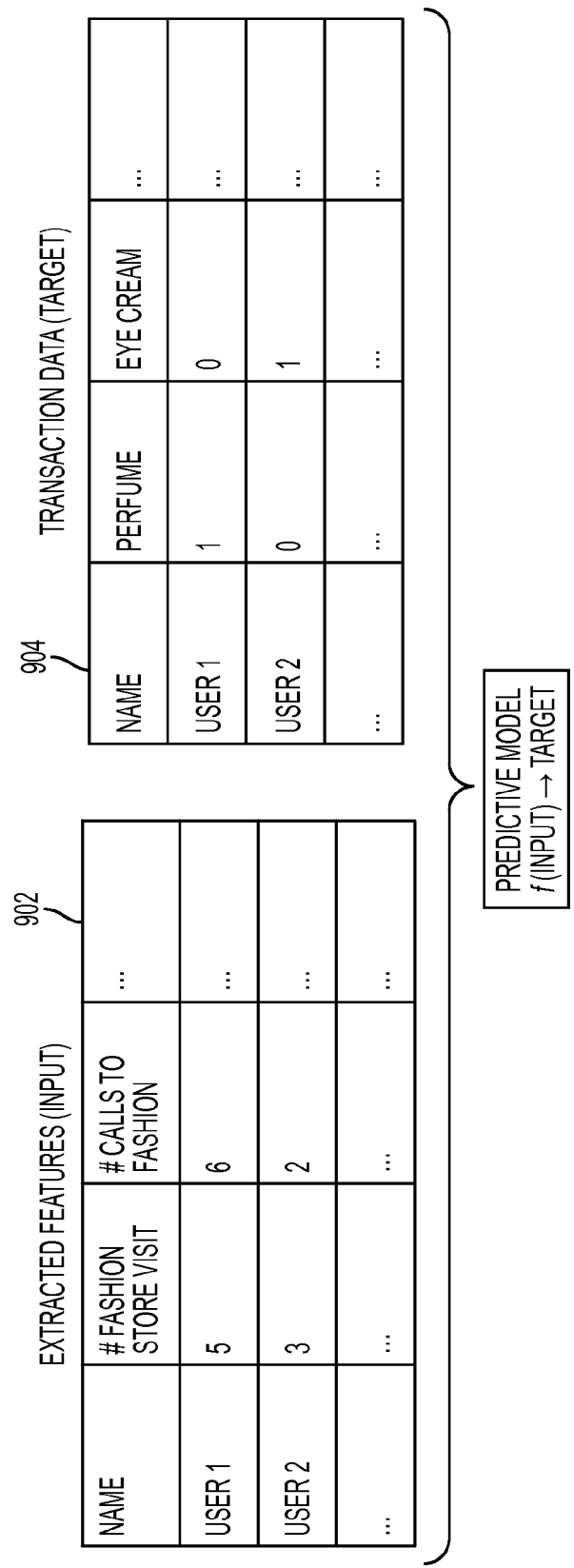
FIG. 9 shows a predictive model for individual intent mining in one embodiment of the present disclosure.
Figure 10:
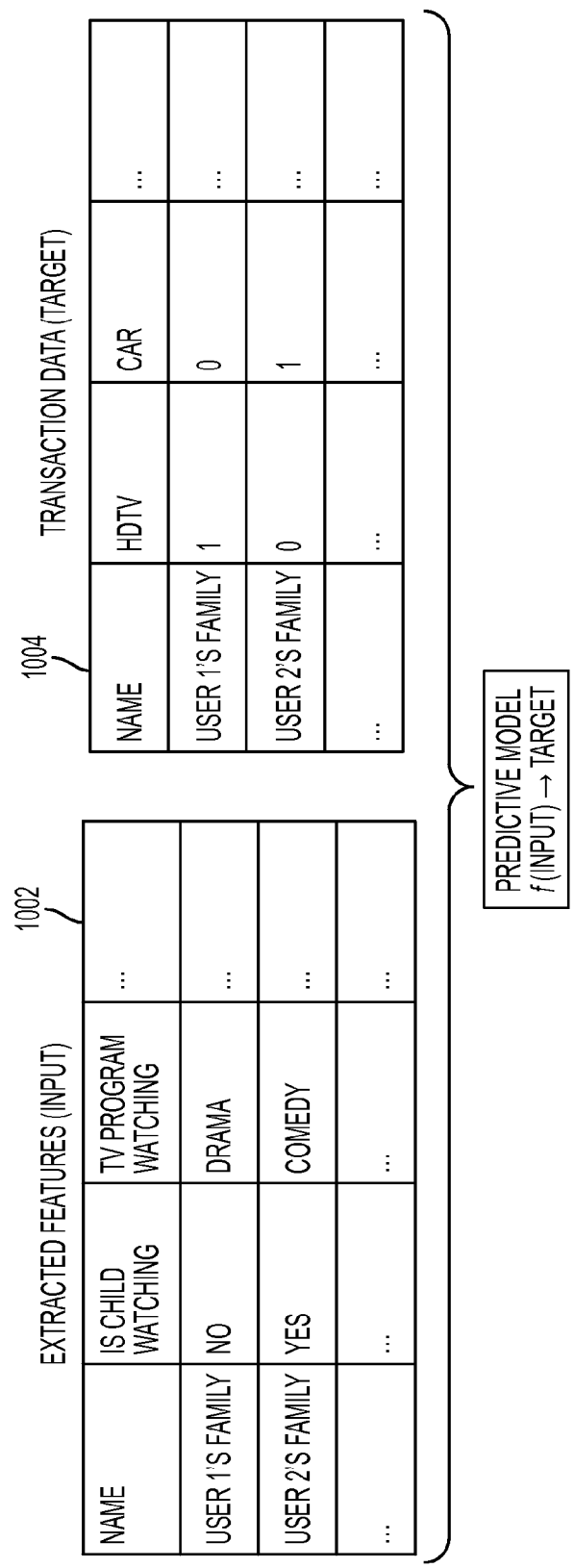
FIG. 10 shows example inputs and outputs of a group intent mining predictive model in one embodiment of the present disclosure.

FIGS. 8-10 illustrate context and intent mining (e.g., shown at 134 and 140 in FIG. 1) in one embodiment of the present disclosure. FIG. 8 shows a context mining in which data from a user's profiles (e.g., user's mobility profile 802, call profile 804 and browse profile 806) are aggregated and transmitted or sent to a scoring function, which scores the items appearing in the profiles based on a scoring algorithm, e.g., frequency counting, normalized frequency, generating category candidates associated with the user. For instance, a summarized context at 808 is shown that summarizes context categories with scores for those categories, e.g., the activities of this user according to the user profiles 802, 804, 806 indicate that on a certain date, the user performed activities related to fashion category three times, activities related to theater category once, and activities related to restaurant category two times. The candidate categories for this user may be further pruned or reduced to a manageable size, e.g., as shown at 810, for example, by keeping scores that meet a threshold or another criterion. In the example shown at 810, the categories that have scores higher than two are kept.

FIG. 9 shows a predictive model for individual intent mining in one embodiment of the present disclosure. Features from a user's user profiles and the user's purchase transaction data of a given period are used to train a predictive model to predict the tendency of a user to buy a certain item or travel to a place at certain time, for example, now or in a predefined near future. Multiple users' data may be used in this predictive model. The following describes examples of features that may be used in training the model: Demographic features (e.g., Age range, Gender, Has children, Education), Context features (e.g., # of store visits and calls, Normalized browsing/watching frequency, Category popularity, Context specific features), Temporal features (e.g., time of day, day of week, season of year, day of year), Context specific features (e.g., Food related features, e.g., type of cuisine such as American, French food?), Travel related features (e.g., Estimate travel distance, TravelTo country), Shopping related features (e.g., Is household related? Is Male related? Is Female related?), Auto related features (e.g., Has the person owned a car? How many cars does his family own? What is the age of his current car?). The model may be an SVM, linear regression, or others, that is jointly trained for the items within each category. Once the model is built, the model may predict the user's tendency or intent to purchase an item 904, given the features of a user (for whom a prediction is being made) 902.

In another aspect, a group intent mining that is different from an individual intent mining may be performed. For example, a separate predictive model may be trained for each family (or household). A set of features may be extracted associated with all the members of the family or household and used with the purchase transaction data of all the members of the family or household to train a group predictive model. Example features that may be used in training the model for group mining intent may include: Is child watching, TV program watching (e.g., Category), Temporal features (e.g., time of day, day of week, season of year, day of year), Context specific features (e.g., Is house related? Is auto related? Is group traveling related?). FIG. 10 shows example inputs and outputs of a group intent mining predictive model in one embodiment of the present disclosure. The group's predictive model predicts based on input set of features 1002 associated with a family (for which a prediction is being made), to predict the tendency 1004 of the family to purchase a certain item or travel to a place at certain time, for example, now or in a predefined near future. In one embodiment, the group intent prediction may be implemented in the same manner as in individual intent prediction except for the features. Group intent prediction leverages group activity related features, such as family travel and family or another group.

Intent can reflect how likely the user will purchase an item, which helps IPTV operators or others push or send more relevant targeted advertisements to the end user in a short advertising time window. For example: An advertisement with a good deal on HDTV is more appealing than the one with tedious introduction to an electronics store for someone who wants to buy an HDTV. In one embodiment of the present disclosure, as described above, intent mining may use data sources such as mobility and calling data, and online browsing data to predict what a user is likely to purchase.

Table 2 shows an example result or outcome of context and intent mining in one embodiment of the present disclosure. Table 2 shows top context categories and potential buying items under these categories. For simplicity, only one day is shown, but the methodology may predict intent for a period of day. The result shows that user 1 is likely to purchase items in fashion category, particularly, perfume and shoes, and user 1's family is likely to purchase items in electronics category, particularly high definition television (HDTV) and an automobile, e.g., particularly model X.

TABLE 2

| Name | Date | Top context categories and their items |
|---|---|---|
| User 1 | Jun. 9, 2013 | Fashion: perfume, Shoes; |
| User 1's family | Jun. 9, 2013 | Electronics: HDTV; Auto: model X |

Figure 11:
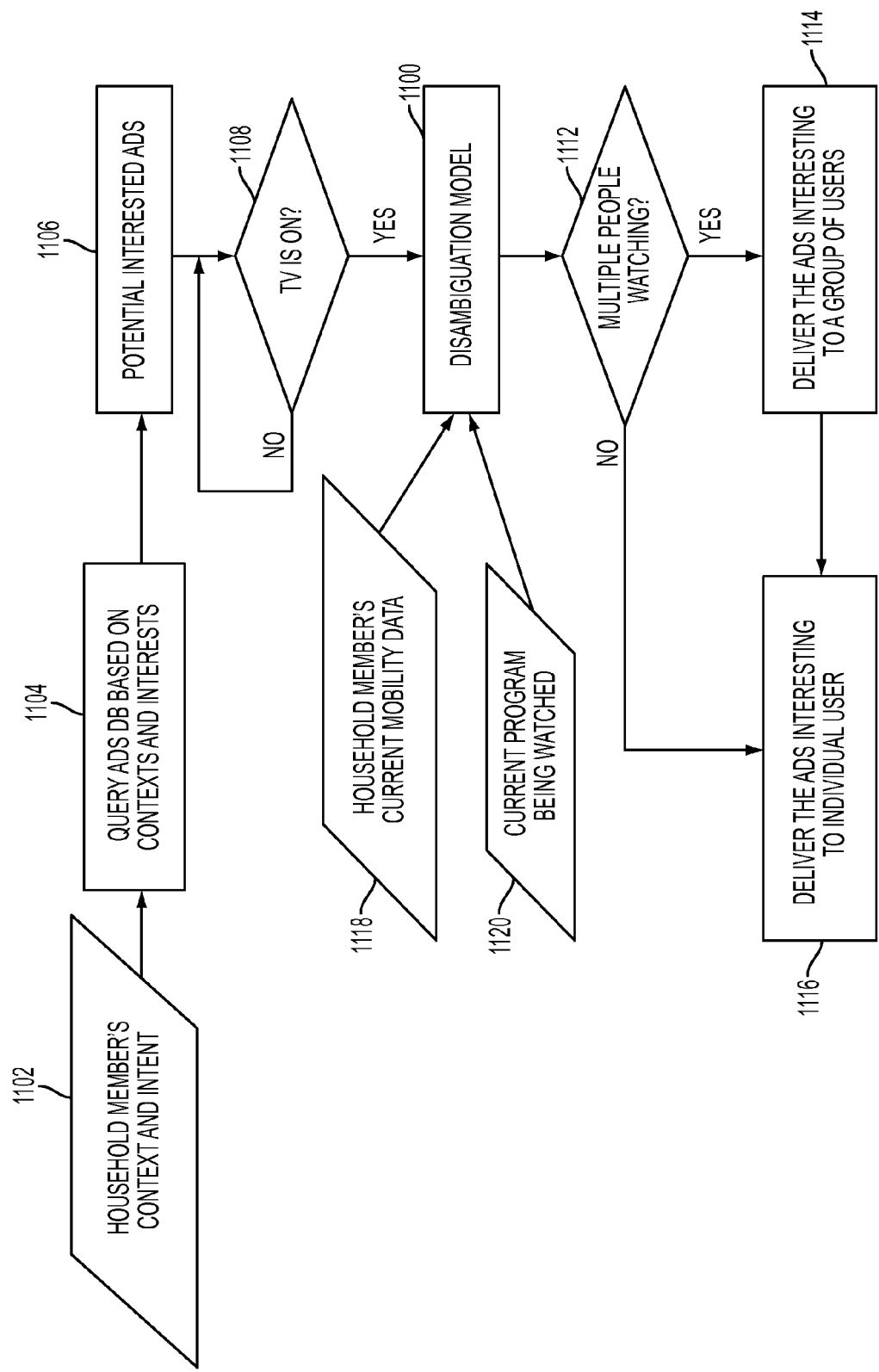
FIG. 11 is a flow diagram showing advertisement selection and delivery method in one embodiment of the present disclosure.

FIG. 11 is a flow diagram showing advertisement selection and delivery method in one embodiment of the present disclosure. Advertisement selection and delivery, e.g., shown in FIG. 1 at 108 may include receiving one or more household member's context and intent at 1102. The household's group intent may be also received. For example, there may be category context and intent information for each member of a household and group intent information associated with the household. A household member's context, for example, includes aggregated or summarized context category from user profiles built using a plurality of data sources. An example of a member's context is shown in FIG. 8. The member's intent may be predicted, for example, using a predictive model, e.g., described with reference to FIG. 9. At 1104, based on the context and intent (e.g., interest in purchasing an item) associated with one or more members of the household and/or the household as a group, advertisement database may be queried to extract potential advertisements at 1106. Advertisement database may contain various advertisements that may be played. At 1108, it is determined whether a television (TV) is on at this household at this time. The service provider that is providing the television service would know whether the TV is on. If it is determined that the TV is not on, the method may idle and periodically check whether the TV is on. If it is determined that the TV is on, a disambiguation to determine who in the household may be watching the TV at this time may be performed at 1100. As described with reference to FIGS. 2-7, this disambiguation may use as input the current mobility data 1118 and the current program being watched or being played 1120 associated with the household members to predict using a previously built disambiguation model, who is watching this TV program.

At 1112, based on the disambiguation model's output, it is determined whether multiple people are watching. If it is determined that multiple people are watching the program, at 1114, one or more advertisements are delivered that match the intent for the group of users, e.g., the family or the household's group intent (e.g., described with reference to FIG. 10). Otherwise, at 1116, one or more advertisements are delivered that match the intent of the individual user determined to be watching the TV program.

In one embodiment, a disambiguation model 1100 leverages mobility data and historical TV/Internet browsing data to predict who watched TV/browsed internet based on the program content and categories. The disambiguation model may be also used to build an enriched personalized user profile, for example, enriching user profiles that may include mobility profile, calling profile, transaction profile with browsing profile. A dictionary of general features and context specific features may be extracted from user profiles that represent subscriber's intent to buy some items or travel to some places. An intent prediction model uses or leverages the feature sets to predict a user's intent.

Figure 12:
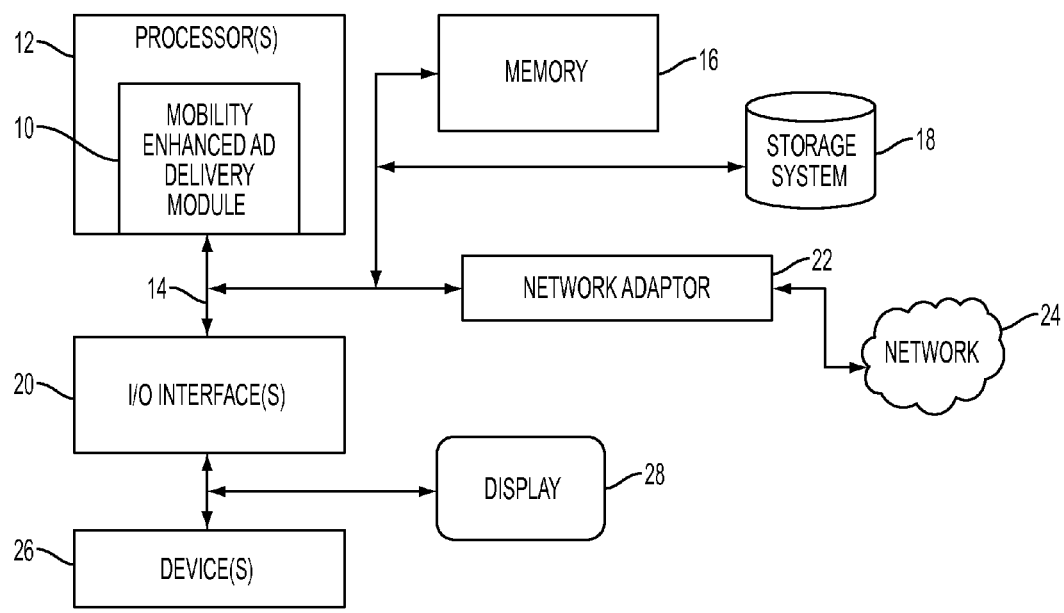
FIG. 12 illustrates a schematic of an example computer or processing system that may implement an advertisement delivery system in one embodiment of the present disclosure.

FIG. 12 illustrates a schematic of an example computer or processing system that may implement a mobility enhanced advertisement system in one embodiment of the present disclosure. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with the processing system shown in FIG. 12 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system may be described in the general context of computer system executable instructions, such as program modules, being executed by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units 12, a system memory 16, and a bus 14 that couples various system components including system memory 16 to processor 12. The processor 12 may include a module 10 that performs the methods described herein. The module 10 may be programmed into the integrated circuits of the processor 12, or loaded from memory 16, storage device 18, or network 24 or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory 16 can include computer system readable media in the form of volatile memory, such as random access memory (RAM) and/or cache memory or others. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

Computer system may also communicate with one or more external devices 26 such as a keyboard, a pointing device, a display 28, etc.; one or more devices that enable a user to interact with computer system; and/or any devices (e.g., network card, modem, etc.) that enable computer system to communicate with one or more other computing devices. Such communication can occur via Input/Output (I/O) interfaces 20.

Still yet, computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

We claim:

1. A method of selecting advertisements to play on internet protocol television, comprising:
   determining individual context and intent for a plurality of members of a household having internet protocol television subscription based on at least mobility data received from one or more mobile devices associated with the plurality of members of a household;
   determining a program played on the internet protocol television;
   predicting, by a processor, which individual in the household is watching the program based on current mobility data associated with the members of the household and user profiles associated with the members of the household, the predicting performed using a disambiguation predictive model built based on mobility data, calling data associated with the members of the household and television watching log associated with the household, the current mobility data determined based at least on information received from said one or more mobile devices associated with the plurality of members of a household, the predictive model built based on one or more of a machine learning technique and a decision tree technique; and
   selecting, by the processor, an advertisement for delivery via the internet protocol television from a database of advertisements that matches an interest of the individual determined to be watching the program, the interest of the individual determined based on the individual context and intent associated with the individual,
   the predicting comprising determining geographic location by longitude and latitude position of the household based on a subscription address of the household, and based on the mobility data comprising at least communication data between candidate members and an account owner associated with the subscription address, and geographic positions of the candidate members, and co-location pattern of the candidate members and the account owner, determining the members of the household, wherein the individual in the household predicted to be watching the program is determined among the members of the household.

2. The method of claim 1, further comprising:
based on the predicting, determining whether multiple members in the household are watching the program, and performing the selecting an advertisement for delivery via the internet protocol television from a database of advertisements that match an interest of the individual determined to be watching the program based on the individual context and intent associated with the individual, responsive to determining that only one member of the household is watching the program.

3. The method of claim 2, further comprising:
determining group context and intent associated with the household, wherein responsive to determining that multiple members are watching the program, selecting second advertisement for delivery that match an interest of the members of the household as a group based on the group context and intent.

4. The method of claim 1, wherein the user profiles comprise an individual user's browsing profile disambiguated based on the user's mobility data, the user's calling data and the television watching log, the user profiles further comprising user's mobility profile, user's calling profile, and user's transaction profile generated based on user's historical transaction data.

5. The method of claim 4, wherein the individual context and intent are determined for a member of the household by aggregating data associated with the member's categories of interest and locations from the user's mobility data and the user's calling data associated with the member of the household, and predicting the member's intent based on an intent predictive model.

6. The method of claim 5, wherein the intent predictive model is trained based on a plurality of features in the user profiles and purchase transaction data, the intent predictive model predicting the member's intent to purchase an item given a set of features associated with the member.

7. The method of claim 6, wherein a group context and intent are determined for the members of the household as a group based on a group intent predictive model, the group intent predictive model built based on a plurality of group features and purchase transaction data associated with a plurality of households.

8. A computer readable storage medium storing a program of instructions executable by a machine to perform a method of selecting advertisements to play on internet protocol television, comprising, the method comprising:
determining individual context and intent for a plurality of members of a household having internet protocol television subscription based on at least mobility data received from one or more mobile devices associated with the plurality of members of a household;
determining a program played on the internet protocol television;
predicting which individual in the household is watching the program based on current mobility data associated with the members of the household and user profiles associated with the members of the household, the predicting performed using a disambiguation predictive model built based on at least mobility data, calling data associated with the members of the household and television watching log associated with the household, the current mobility data determined based at least on information received from one or more mobile devices associated with the members of the household, the predictive model built based on one or more of a machine learning technique and a decision tree technique; and
selecting an advertisement for delivery via the internet protocol television from a database of advertisements that matches an interest of the individual determined to be watching the program, the interest of the individual determined based on the individual context and intent associated with the individual,
the predicting comprising determining geographic location by longitude and latitude position of the household based on a subscription address of the household, and based on the mobility data comprising at least communication data between candidate members and an account owner associated with the subscription address, and geographic positions of the candidate members and co-location pattern of the candidate members and the account owner, determining the members of the household, wherein the individual in the household predicted to be watching the program is determined among the members of the household.

9. The computer storage medium of claim 8, further comprising:
based on the predicting, determining whether multiple members in the household are watching the program, and performing the selecting an advertisement for delivery via the internet protocol television from a database of advertisements that match an interest of the individual determined to be watching the program based on the individual context and intent associated with the individual, responsive to determining that only one member of the household is watching the program.

10. The computer storage medium of claim 9, further comprising:
determining group context and intent associated with the household, wherein responsive to determining that multiple members are watching the program, selecting second advertisement for delivery that match an interest of the members of the household as a group based on the group context and intent.

11. The computer storage medium of claim 8, wherein the user profiles comprise an individual user's browsing profile disambiguated based on the user's mobility data, the user's calling data and the television watching log, the user profiles further comprising user's mobility profile, user's calling profile, and user's transaction profile generated based on user's historical transaction data.

12. The computer storage medium of claim 11, wherein the individual context and intent are determined for a member of the household by aggregating data associated with the member's categories of interest and locations from the user's mobility data and the user's calling data associated with the member of the household, and predicting the member's intent based on an intent predictive model.

13. The computer storage medium of claim 12, wherein the intent predictive model is trained based on a plurality of features in the user profiles and purchase transaction data, the intent predictive model predicting the member's intent to purchase an item given a set of features associated with the member.

14. The computer storage medium of claim 13, wherein a group context and intent are determined for the members of the household as a group based on a group intent predictive model, the group intent predictive model built based on a plurality of group features and purchase transaction data associated with a plurality of households.

15. A system for selecting advertisements to play on internet protocol television, comprising:
- a hardware processor; and
- a storage device storing user profiles, wherein the user profiles comprise an individual user's browsing profile disambiguated based on the user's mobility data, the user's calling data and the television watching log, the user profiles further comprising user's mobility profile, user's calling profile, and user's transaction profile generated based on user's historical transaction data;
- the hardware processor operable to determine individual context and intent for a plurality of members of a household having internet protocol television subscription based on at least mobility data received from one or more mobile devices associated with the plurality of members of a household,
- the hardware processor further operable to determine a program played on the internet protocol television,
- the hardware processor further operable to predict which individual in the household is watching the program based on current mobility data associated with the members of the household and the user profiles associated with the members of the household, the hardware processor using a disambiguation predictive model built based on at least mobility data, calling data associated with the members of the household and television watching log associated with the household, the predictive model built based on one or more of a machine learning technique and a decision tree technique,
- the hardware processor further operable to select an advertisement for delivery via the internet protocol television from a database of advertisements that matches an interest of the individual determined to be watching the program, the interest of the individual determined based on the individual context and intent associated with the individual,
- the hardware processor operable to predict at least by determining geographic location by longitude and latitude position of the household based on a subscription address of the household, and determining the members of the household based on the mobility data comprising at least communication data between candidate members and an account owner associated with the subscription address, and geographic positions of the candidate members, and co-location pattern of the candidate members and the account owner, wherein the individual in the household predicted to be watching the program is determined among the members of the household.

16. The system of claim 15, wherein based on predicting, the hardware processor is further operable to determine whether multiple members in the household are watching the program, and the hardware processor selecting an advertisement for delivery via the internet protocol television from a database of advertisements that match an interest of the individual determined to be watching the program based on the individual context and intent associated with the individual, responsive to determining that only one member of the household is watching the program.

17. The system of claim 16, wherein the hardware processor is further operable to determine a group context and intent associated with the household, wherein responsive to determining that multiple members are watching the program, the hardware processor selecting second advertisement for delivery that match an interest of the members of the household as a group based on the group context and intent.

18. The system of claim 15, wherein the individual context and intent are determined for a member of the household by aggregating data associated with the member's categories of interest and locations from the user's mobility data and the user's calling data associated with the member of the household, and predicting the member's intent based on an intent predictive model.

19. The system of claim 18, wherein the intent predictive model is trained based on a plurality of features in the user profiles and purchase transaction data, the intent predictive model predicting the member's intent to purchase an item given a set of features associated with the member.

20. The system of claim 19, wherein a group context and intent are determined for the members of the household as a group based on a group intent predictive model, the group intent predictive model built based on a plurality of group features and purchase transaction data associated with a plurality of households.

* * * * *